May 20, 1958 C. F. LEATHERS 2,835,721
ELECTRICAL WELDING CABLE
Filed May 27, 1954 2 Sheets-Sheet 1
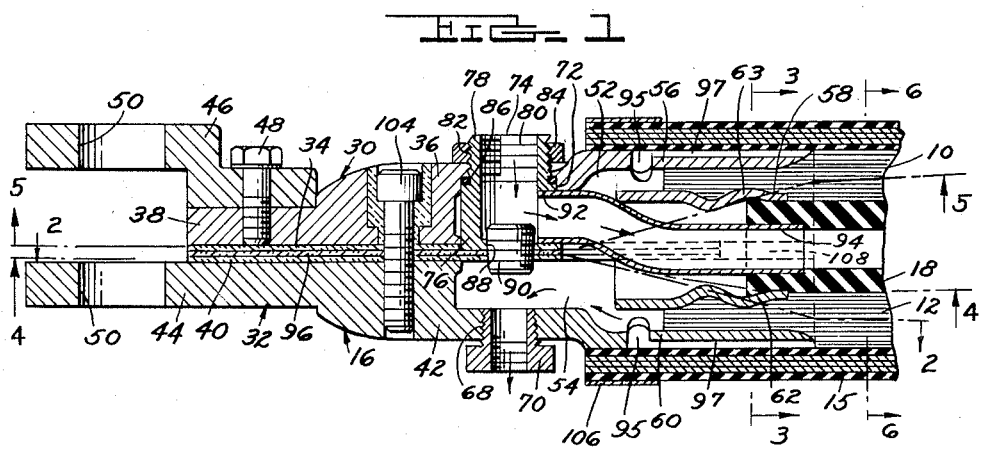
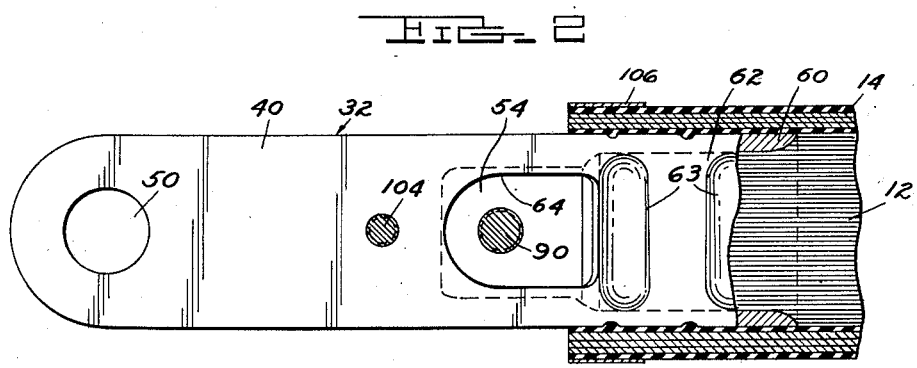
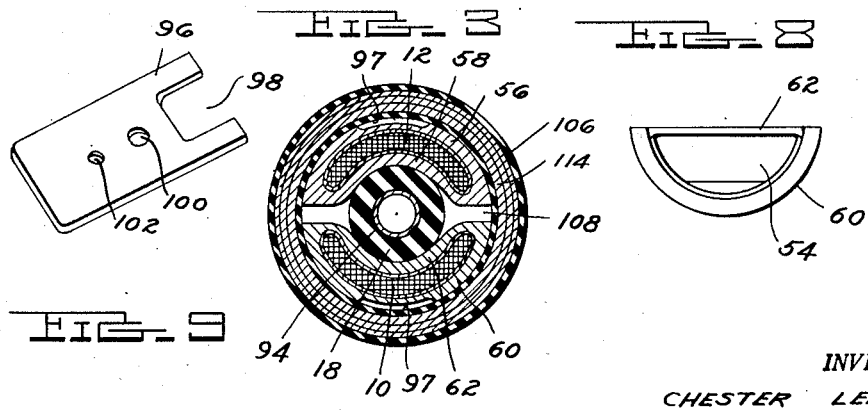
INVENTOR.
CHESTER LEATHERS
BY
Barnes, Kisselle, Laughlin & Raisch
ATTORNEYS

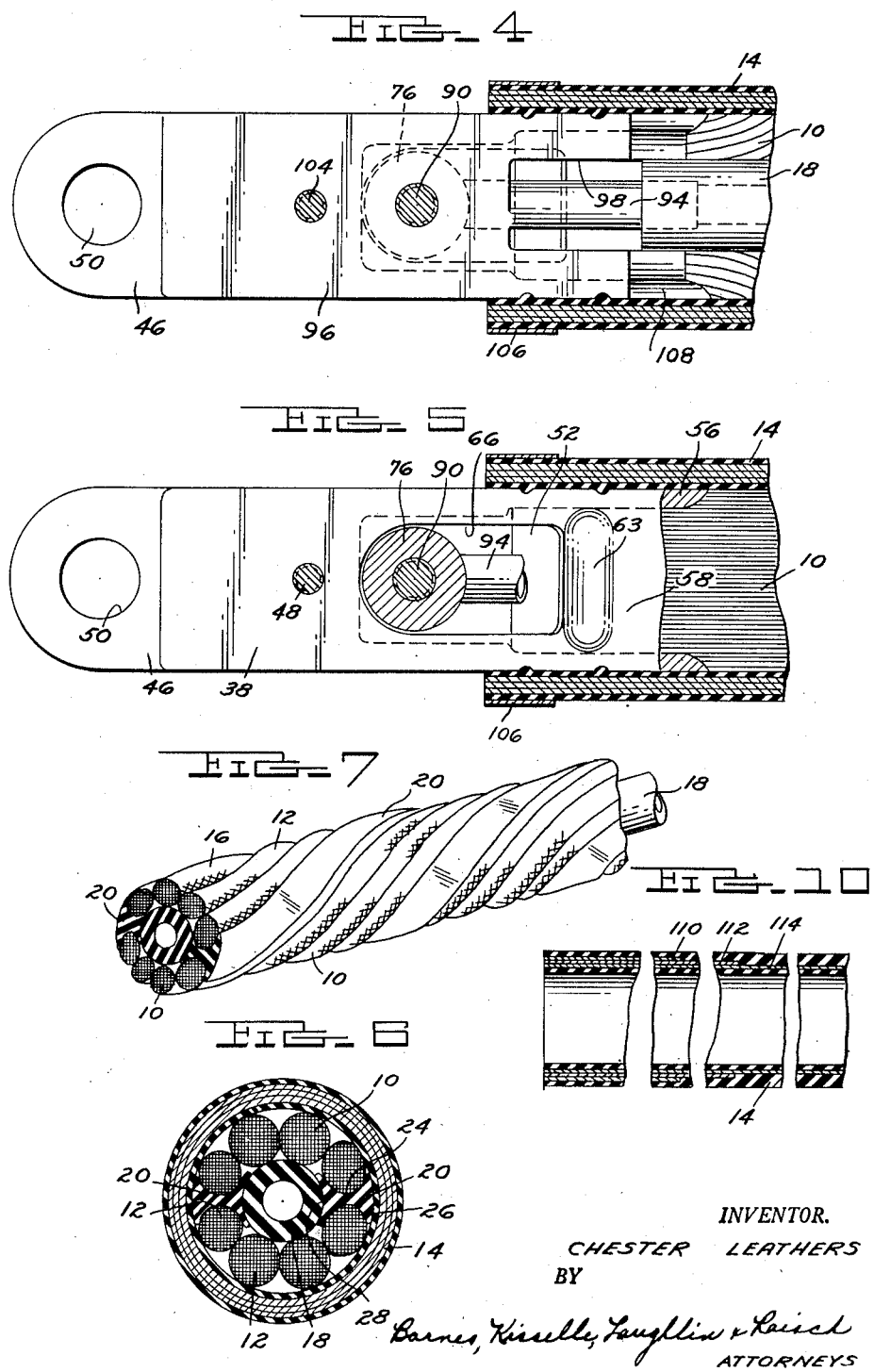

United States Patent Office 2,835,721
Patented May 20, 1958

2,835,721
ELECTRICAL WELDING CABLE

Chester F. Leathers, Kalamazoo, Mich., assignor to Progressive Welder Sales Co., Detroit, Mich., a corporation of Michigan Application May 27, 1954, Serial No. 432,682

12 Claims. (Cl. 174—15)

This invention relates to an electrical welding cable and has particularly to do with the construction of the terminals at each end of the cable.

It is an object of this invention to provide an electric welding cable of economical and durable construction, one which can be serviced readily, and to provide a cable head construction for an electric welding cable having a novel passageway arrangement therein for conducting coolant through the cable..

In the drawings:

Fig. 1 is a longitudinal sectional view through one head and an end portion of the cable of the present invention.

Fig. 2 is a sectional view taken along the line 2—2 in Fig. 1.

Fig. 3 is a sectional view taken along the line 3—3 in Fig. 1.

Fig. 4 is a sectional view taken along the line 4—4 in Fig. 1.

Fig. 5 is a sectional view taken along the line 5—5 in Fig. 1.

Fig. 6 is a sectional view taken along the line 6—6 in Fig. 1.

Fig. 7 is a fragmentary perspective view of the conductor portion of the cable with the sheath removed.

Fig. 8 is an end view of one of the terminals prior to securing one of the groups of conductors thereto.

Fig. 9 is a perspective view of the insulating member which insulates the two terminals of each cable head from each other.

Fig. 10 is a fragmentary sectional view of an end portion of the cable casing.

Referring to the drawings and particularly to Fig. 1, the conductor cable of this invention includes two sets of electrical conductors 10 and 12 which are enclosed within a flexible casing 14 formed of an insulating material such as rubber; and at each end, the cable is provided with a head 16, one of the heads being adapted for connection with the welding gun and the other end being adapted for connection with the welding transformer. As is shown in Fig. 7, the two sets of conductors are divided into several individual groups 16 which are helically wound. These individual group windings 16 are in turn spirally wound around a central flexible conduit 18 which is preferably formed of a high strength rubber. The individual group windings 16 are disposed side by side circumferentially around conduit 18, and the two groups 10 and 12 of the conductors are insulated from each other by two dividers 20 which are also spirally wound around conduit 18. Dividers 20 are preferably extruded from rubber, neoprene or the like, and are generally I-shaped in cross section as shown in Fig. 6. Each divider has rounded concave side walls 24 which interfit with the adjacent group winding 16 and is fashioned with curved outer and inner edge portions 26 and 28 to correspond with the inner and outer surfaces of sheath 14 and conduit 18, respectively.

By winding the group windings 16 spirally around the central flexible conduit 18, the cable is permitted to bend without substantial flexing or stretching of the individual wire strands of the conductors. The bending action of the conductors can be controlled by varying the angle of the spiral which in turn can be controlled by the diameter of central conduit 18. It follows that the more coils per inch length of cable, the less is the movement of each coil for any given bending radius. However, the length of the conductors is determined by the number of coils per inch; and thus, the electrical resistance of the cable increases with the greater number of coils. As a practical matter, the diameter of central conduit 18 is controlled to compromise these two factors for optimum cable performance.

The cable heads 16 at the opposite ends of the cable are substantially the same construction. Each cable head comprises two terminal members 30 and 32 which are formed as more or less symmetrical half portions. Terminal member 30 is formed with a flat inner face 34 and has a body portion 36 of generally semi-cylindrical shape which terminates at its outer end in a flat lug 38. Terminal member 32 is likewise formed with a flat inner face 40 and with a generally semi-cylindrically shaped body portion 42 which terminates at its outer end in a flat lug 44. Lug 44 is of longer length than lug 38. These lugs, however, may be of the same length. In the arrangement shown, an adapter 46 is secured to lug 38 as by a screw 48 so that the adapter 46 and lug 44 provide spaced apart lugs for connection either with a transformer or a welding gun, as the case may be. Lug 44 and adapter 46 are provided with aligned bolt openings 50.

The body portions 36 and 42 are hollow throughout a major portion of their axial extent. These terminals are formed with axially extending cavities designated 52 in terminal member 36 and 54 in terminal member 42. The cavity 52 is defined by the semi-cylindrical wall 56 and a web portion 58 which spans across the longitudinal edges of walls 56, and the cavity 54 is defined by the semi-cylindrical wall 60 and the web 62 which spans the longitudinal edges of wall 60. Web 62 is fashioned with an opening 64, and web 58 is formed with an opening 66. The terminal members 30 and 32 are initially formed with webs 58 and 62 extending flatly or diametrically across the inner face of these members as shown in Fig. 8. However, in assembly, the ends of one group of conductors, the conductors 10, for example, are inserted into the end of terminal member 32; and the ends of the other group of conductors, the group 12, for example, are inserted into the end of terminal member 30. Thereafter, the portion of webs 58 and 62 disposed inwardly of the openings 64 and 66 are staked or crimped by means of a suitable tool to thereby compress and mechanically lock the ends of the two groups of conductors with the terminals. This staking or crimping operation is preferably performed so that the web portions 58 and 62 are of corrugated shape in axial section such as shown at 63. It has been found that by crimping or staking these web portions in this manner, a very secure locking between the ends of the conductors and the terminals is obtained.

In operation, the electrical conductors in cables of this type become relatively hot; and it is therefore necessary to conduct coolant through the cable. Accordingly, the terminal member 32 is provided with a threaded port 68 in the side wall 60 thereof which communicates with cavity 54. A fitting 70 is threaded into this port. Likewise, terminal member 30 is provided with a port 72 in the wall 56 thereof which communicates with cavity 52. Within port 72, there is arranged a fitting 74 having a body portion 76 disposed within cavity 52 and a reduced portion 78 which extends outwardly through port 72. Fitting 74 has an internally threaded bore 80, and the reduced portion 78 is externally threaded as at 82. A nut 84 engages the external threads 82 to firmly secure the fitting 74 in port 72. A gasket 86 is provided for effecting a leak-proof connection at this point. The inner axial end of fitting 74 is provided with an opening 88 which, in the head at one end of the cable, is closed by a plug 90. Fitting 74 is also fashioned with a transverse bore 92 intersecting bore 80. A metal tube 94 has one end brazed or otherwise secured in bore 92. Tube 94 extends from fitting 74 through opening 66, and its free end extends axially between the web portions 58 and 62. This tube 94 is telescoped within flexible conduit 18.

Between the flat faces 34 and 40 of terminal members 30 and 32 respectively, there is arranged a multilayer, elongate insulating member 96. The insulating member 96, which is best shown in Fig. 9, has a U-shaped notch 98 at the inner end thereof to provide clearance for tube 94. It is also provided with openings 100 and 102 for accommodating plug 90 and the clamping screw 104, respectively. It will be observed particularly from Figs. 1 and 4 that the insulating member 96 terminates at its inner end outwardly of the inner ends of terminal members 30 and 32.

The semi-cylindrical walls 56 and 60 are formed with circumferentially extending ports 95 therein. Ports 95 communicate with cavities 52 and 54 at their inner ends and with longitudinally extending slots 97 on the outer surface of walls 56 and 60. Slots 97 are preferably formed by indenting these walls simultaneously with the staking or crimping of webs. Slots 97, it will be noted, extend from ports 95 to the inner ends of walls 56 and 60.

In assembly, after the two groups of conductors 10 and 12 are clamped into the ends of terminal members 30 and 32 as described above, the flexible conduit 18 is slipped over the end of tube 94; and the two terminal members 30 and 32 are arranged in face to face relation with the insulating member 96 disposed therebetween. The members are then clamped together by means of clamping screw 104. When the members 30 and 32 are thus clamped together, the distorted web portions 58 and 62 engage the outer surface of flexible conduit 18 on diametrically opposite sides thereof and clamp this conduit firmly on tube 94. Thereafter, the casing 14 is slipped over the end of the cable head and secured in place by the clamping bands 106.

At one of the heads 16 at opposite ends of the cable, the fitting 74 is employed for connecting the cable head with a source of coolant; and the fitting 70 provides an outlet adapted to be connected with a discharge coolant line. In the opposite cable head, the fittings 70 and 74 are plugged; and the plug 90 is omitted.

Thus, coolant is caused to flow into the one head 16 through the fitting 74 and tube 94 through the central conduit 18 to the head at the opposite end of the cable. The coolant flowing into the head 16 at the end of the cable opposite that shown flows through the opening 88 and fills cavities 52 and 54. From the cavities 52 and 54, the coolant flows outwardly through the ports 95 and through the wire strand conductors. Since the insulator 98 terminates short of the inner ends of the terminals, there is provided a gap 108 on opposite sides of the head between the inner end portions of faces 34 and 40. The coolant is thus permitted to also flow in a direction outwardly through these gaps and back through the strands of the conductor axially along the cable. The coolant which flows back through the conductors fills the cavities 52 and 54 in the cable head shown in Fig. 1 and is discharged therefrom through the outlet fitting 70 and into a discharge line connected therewith which is not shown.

The liquid coolant is preferably circulated down through the central conduit 18 to the gun end of the cable and then back through the conductors so as to prevent small broken pieces of the copper conductors from collecting in the opening 88 or in the head adjacent the gun end of the cable. It will be appreciated, of course, that if desired, the head at the gun end of the cable may be connected with the cooling circuit of the gun itself so that the coolant from the central conduit 18 is directed through the coolant passageways of the gun before returning to the conductor side of the cable.

With the cable construction described herein, it will be seen that if it is necessary to remove or replace the casing 14 or otherwise service the cable heads, this can be accomplished without disconnecting the conductors 10 and 12 from the terminal members 30 and 32. The casing 14 may be slipped off of either cable head simply by removing adapter lug 46, clamping screw 104, lock nut 84 and fitting 70. The two terminals are then pried apart by means of a prying tool such as a screw driver or the like, and fitting 74 is retracted from port 78 and then shifted axially outwardly to disengage the end of tube 94 from within the end of flexible conduit 18. After the fitting 74, together with the tube 94 which is connected thereto, is disengaged from conduit 18, it is removed from between the two terminals. The terminals are then permitted to spring back to their face to face relation; and clamping bands 106 having been removed, the casing 14 can be slipped over either of the cable heads.

Thus, it will be seen that the present invention provides a cable construction which is very durable and nevertheless of economical construction. The flexible conduit 18 which is preferably fashioned of fabric reenforced rubber provides the means for imparting axial strength to the cable. The crimping of the webs 58 and 62 in the manner described provides a connection between the conductors and the terminals which is not only relatively easily effected, but which also provides a very secure connection between these parts without the necessity of resorting to brazing or soldering. Furthermore, it will be observed that by forming the webs 58 and 62 so that in the assembled relation of the head, these webs engage the ends of the flexible conduit 18, a pull on the opposite ends of the cable is resisted primarily by the flexible conduit 18, not by the conductors 10 and 12. The construction also provides a novel and economical means for enabling the circulation of coolant water through the cable.

In addition, the cable may be further re-enforced at its opposite ends so that it will bend around a smooth curve of relatively large radius as distinguished from bending or kinking sharply. These re-enforcing means are preferably provided by strips of fabric, 110, 112 and 114 (Fig. 10) of progressively increasing length embedded in the casing 14. I have found that when the fabric strips 110, 112 and 114 are arranged as shown in Fig. 10 to form a tapered re-enforcement extending about 16" inwardly of each end of the cable, kinking of the cable at either end is eliminated; and the portion of the cable most vulnerable to damage is thus protected.

I claim:

1. An electric welding cable comprising two groups of conductors spirally wound around a flexible conduit and insulated from each other, a cable head at opposite ends of said cable, at least one of said cable heads comprising a pair of longitudinally extending terminals in face-to-face relation having generally semi-cylindrical inner end portions, said terminals each having a generally semi-cylindrical cavity extending axially therein, the outer ends of said terminals being adapted for connecting the cable with an electrical welder, said cavities extending to at least adjacent the inner ends of said terminals, the flat side of said cavity being defined by a web portion which connects with the arcuate wall of the cavity along opposite edges, the ends of said groups of conductors extending one into each of said cavities, said web portions forming opposed inner faces of said terminals when the terminals are secured together in face-to-face relation and being staked towards the arcuate wall portions to mechanically lock the ends of the conductors in said terminals, said wall portions each being distorted into generally semi-circular shape, the semi-circular shaped portions of said web portions extending circumferentially around and engaging the end of said flexible conduit.

2. The combination set forth in claim 1 wherein one of said terminals has a tubular fitting therein which extends to adjacent the inner end of said terminal, said flexible conduit being telescoped over the end of said fitting and said semi-circular shaped portions of said webs serving to clamp said flexible conduit on the end of said tubular fitting.

3. An electric welding cable comprising a flexible conduit having two groups of electrical conductors wound spirally therearound and insulated from each other, a cable head at each end of said cable, said cable heads each comprising a pair of terminal members each having a generally semi-cylindrical inner end portion, said terminals each having an axially extending socket at the inner ends thereof in which said conductors are secured, said terminals being secured together in face to face relation with an elongate insulating member interposed therebetween, one of said terminal members having a tubular member in said socket, one end of which is telescopically engaged with the adjacent end of said flexible conduit, said tubular member having its other end communicating with an external port on said one terminal, said terminals having adjacent their inner ends generally semi-circular surface portions which, when the terminals are secured together, engage said flexible conduit and clamp it on the end of said tubular member, said cable having a tubular casing surrounding said conduit and conductors and telescoped over the inner ends of said terminals.

4. An electric welding cable as called for in claim 3 wherein said elongate insulating member terminates within said tubular casing at a point spaced axially outwardly of the inner ends of said terminals whereby a passageway is formed between opposed face portions of said terminals at the inner ends thereof and means for conducting a coolant liquid to said passageway whereby to direct coolant to and around said two groups of conductors.

5. The combination set forth in claim 4 wherein said terminals are each provided with cavities therein which cooperate to define an axially extending passageway in said cable head communicating with said last mentioned passageway, said other terminal having a port therein which communicates with said axially extending passageway and means for connecting an external coolant conduit with said port.

6. An electric welding cable comprising a flexible conduit, two groups of electrical conductors wound spirally around said conduit, a cable head at opposite ends of said conductors, said cable heads each comprising a pair of elongate terminals of generally semi-cylindrical shape secured together longitudinally side by side in face to face relation with an elongate insulating member interposed therebetween, a flexible casing extending from one of said cable heads to the other and enclosing said conduit and conductors, one terminal at each end of said cable having a port therein, a fitting in each of said heads having a portion extending outwardly through said port, said fitting having a bore therethrough, a tubular member in said head connected with said flexible conduit at one end and communicating at its other end with the bore in said fitting, the other terminal in each head having a threaded opening therethrough which communicates with the interior of said head, the fitting in one of said heads having a plug closing the inner end of the bore therein and the fitting in the head at the other end of the cable having a plug closing the outer end of the bore therein.

7. A terminal for an electric welding cable comprising an elongate body having an axially extending, generally semi-cylindrical portion at one end, said end of said terminal having an axially extending generally semi-cylindrical cavity therein, said cavity being defined around one side thereof by an arcuate wall which forms the outer cylindrical surface of said end portion and along another side by a web portion which spans the cavity transversely and connects along each side with the opposite longitudinal edge portions of said arcuate wall, said arcuate wall having an axially extending groove in the outer surface thereof, said groove extending to said one end of said body, the body having an opening through said arcuate wall at the other end of said groove establishing communication between said cavity and groove.

8. The combination set forth in claim 7 wherein said cavity extends axially from said one end of said terminal a greater distance than said web.

9. The combination set forth in claim 8 wherein said terminal is provided with a substantially flat inner face, said flat inner face being provided with an opening therein which communicates with said cavity adjacent the end of said web.

10. The combination set forth in claim 9 wherein said terminal is provided with a port extending transversely therethrough, the axial projection of said port intersecting said cavity and said opening in said flat inner face.

11. An electric welding cable comprising a flexible conduit, two groups of electrical conductors wound spirally around said conduit, a cable head at opposite ends of said conductors, said cable heads each comprising a pair of elongate terminals having generally semi-cylindrical inner end portions secured together in face-to-face relation with an elongate insulating member interposed therebetween and spacing said terminals apart, said terminals each having an axially extending cavity therein, the ends of said two groups of electrical conductors extending into said cavities and secured to said terminals, a flexible casing extending from one of said cable heads to the other and enclosing said conduit, said conductors and the inner ends of said terminals, the terminals at one of said heads each having an external port, a fitting connecting one of said external ports with the adjacent end of said conduit, the other of said ports communicating with the cavities in said terminals, said insulating element terminating short of the inner ends of said terminals whereby to form a gap therebetween providing a coolant passageway from said flexible casing to the cavities in said terminals.

12. An electric welding cable as called for in claim 11 wherein each of said terminals is provided with an axially extending groove in the outer cylindrical surface thereof, said groove extending to said inner end of said terminals, said terminals each having an opening therethrough establishing communication between the cavity therein and the other end of said groove, said casing overlying the full length of said grooves.

References Cited in the file of this patent

UNITED STATES PATENTS

| | | |
|---|---|---|
| 2,222,574 | Robertson | Nov. 19, 1940 |
| 2,234,435 | Johnson | Mar. 11, 1941 |
| 2,308,673 | Burgett | Jan. 19, 1943 |
| 2,320,470 | Rees | June 1, 1943 |
| 2,433,588 | Wreford | Dec. 30, 1947 |
| 2,504,777 | Wreford | Apr. 18, 1950 |
| 2,752,412 | Wreford et al. | June 26, 1956 |